Figure 1:
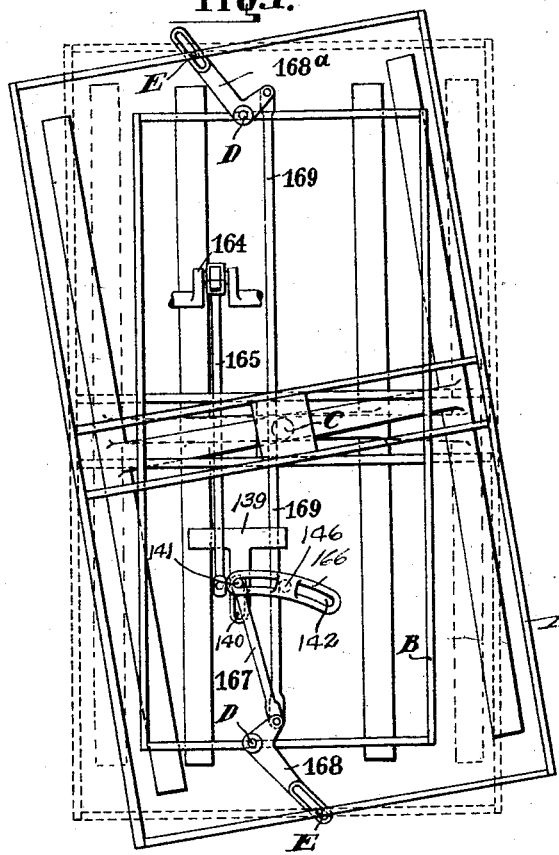

June 23, 1925.

R. VENZLAFF

STEERING STEPPER

Original Filed Feb. 16, 1921

1,543,535

Inventor
Richard Venzlaff
by his Attorney.

Patented June 23, 1925.

1,543,535

UNITED STATES PATENT OFFICE.

RICHARD VENZLAFF, OF BERLIN, GERMANY, ASSIGNOR OF ONE-THIRD TO ARTHUR VON MUMM AND ONE-THIRD TO WALTER VON MUMM, BOTH OF BERLIN, GERMANY.

STEERING STEPPER.

Original application filed February 16, 1921, Serial No. 445,552. Divided and this application filed March 23, 1922. Serial No. 546,176.

*To all whom it may concern:*

Be it known that I, RICHARD VENZLAFF, a citizen of Germany, residing at Berlin, Germany, have invented certain new and useful Improvements in Steering Steppers (for which I have filed application in Germany April 12th, 1920), of which the following is a specification.

My invention relates to vehicles and more especially to vehicles gliding across supports carried along by the vehicle itself. For the transport of loads across uneven roads or in regions lacking good roads, it has already been repeatedly proposed to employ in the place of vehicles fitted with wheels and besides the class of vehicles commonly known as "tanks" and operating by means of endless link-chains, vehicles moving on runners which are alternately raised and then set down on the ground and across which the vehicle then glides forward. As soon therefore as the underframe along with the body has glided across a set of runners, in order to pass over on to another set which has meanwhile been moved forward, the first set of runners is raised from the ground and shifted forward along the underframe only to be set down again on the ground in front of the underframe and once again to serve as a support for the underframe as it glides forward.

In vehicles of this particular kind lateral steering has hitherto proved very difficult and it is an object of the present invention to provide means for effecting the lateral steering with great ease and without considerable expense of power.

This application is a division of my previous application Serial No. 445,552, filed February 16, 1921.

In the drawings accompanying this specification and forming part thereof a steering device embodying my invention is illustrated diagrammatically by way of example. In the drawings—

Fig. 1 is a plan of the frame, the platform, which is rigidly fixed to the inner frame, being removed.

Figure 2:
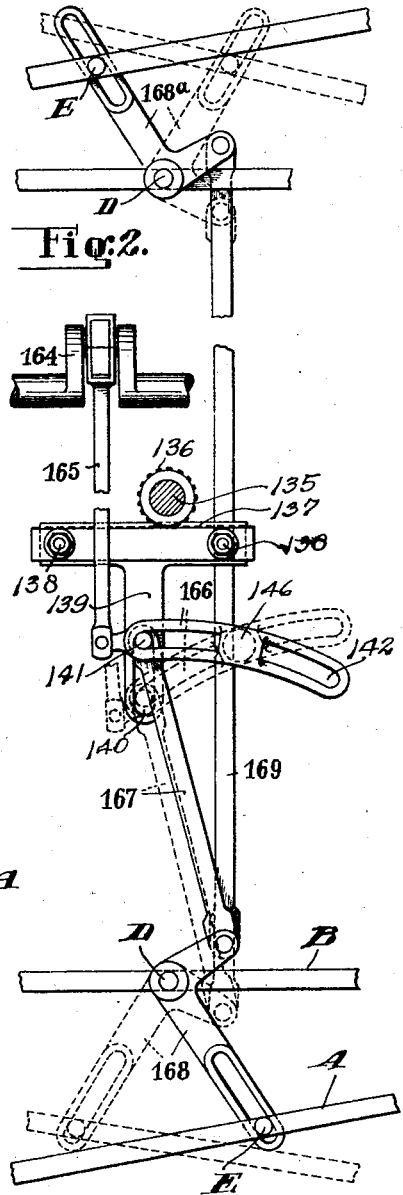

Fig. 2 discloses on an enlarged scale the position of the parts after steering has been effected, the position drawn in full lines showing the rocking of the outer relieved pair of runners relatively to the inner pair, while the position indicated in dash lines shows the position of the outer pair of runners, after it has been rocked in the direction relatively to the inner pair.

A is a rectangular frame carrying the outer pair of runners and B is a similar frame carrying the inner pair of runners and the platform, this latter as well as the runners being left out for the sake of clearness. The frames A and B are pivoted to one another by a pivot pin C. If the outer pair of runners is resting on the ground with the weight of the car and load acting thereon, the inner pair of runners with its frame B being relieved and out of contact with the ground can be turned about pivot pin C, and vice versa. The means for thus turning one or the other frame consists of a pair of angle levers 168, 168$^a$ pivoted with their apexes D to one of the frames and with their outer ends E to the other frame, while their inner ends are acted upon by the motor (not shown) and crank shaft 164. Obviously, if the outer frame A is loaded and the inner frame relieved, a force acting on the inner arms of the angle levers will cause the levers to swing about their outer ends E which are immobilized with the outer frame, thereby displacing the inner frame B about the pivot pin C. As in the example illustrated in the drawings the platform is assumed to be fixed to the inner frame, it will participate in the swinging movement and the entire load will thus swing about the pivot pin C and the outer frame A resting on the ground with the outer pair of runners. On the other hand, if, as shown on the drawing, the inner pair of runners resting on the ground has immobilized the inner frame, the outer frame will swing about the pivot pin C now carried by the inner frame, the force acting on the inner ends of the angle levers causing these latter to swing about their apexes D, D and their outer ends to turn the outer frame.

On the crank 164 being turned, the link 165 connected thereto displaces the slotted segment 166 in which a link 167 pivoted to the angle lever 168 is adapted to move. Along with the link 167 a rod 169 engages the angle lever 168, the said rod being connected with the angle lever 168$^a$, corresponding to lever 168 and arranged at the opposite end, rod 169 serving to transmit the motion executed by the one lever to the other.

On the steering column 135 (Fig. 2) there is fixed a small gear wheel 136 gearing with a rack 137 which is rigidly connected by bolts 138 with a T-shaped piece 139, the middle portion of which has a slot 140 which embraces a bolt 141 fixed to the platform. The end of this bolt extends into the curved slot 142 of the segment 166 which permanently oscillates about the pivot 146 fixed to the platform.

If it be now intended to steer the vehicle, then by means of the steering column 135 the T-shaped element 139 is shifted towards that side in the direction of which the vehicle shall be steered. The middle arm of the T-shaped member 139 carries the pin 141 along, so that the pin is shifted toward one or the other extremity of the slot 142 formed in the segment and therefore participates in the movements carried out by the extremity on the side in question. Along with this pin 141, the rod 167 is now also shifted to and fro and strives to rock the angle levers 168 and 168ª about their respective apexes D, thereby causing their outer ends E to turn the outer frame A and the outer runners about the pivot pin C.

I wish it to be understood that I do not desire to be limited to the exact details of construction shown and described, for obvious modifications will occur to a person skilled in the art.

I claim:—

1. A vehicle comprising in combination, two pairs of runners, a frame rigidly connecting the runners of each pair to form a unit, an angle lever adapted to swing about the frame of one pair and pivotally engaging the frame of the other pair, a double armed segment capable of pivoting on said latter frame, a crank shaft, operative connection between said shaft and said segment for causing permanent rocking motion of said segment and a link pivoted to the free end of said angle lever and to one end of said segment.

2. A vehicle comprising in combination, two pairs of runners, a frame rigidly connecting the runners of each pair to form a unit, an angle lever adapted to swing about the frame of one pair and pivotally engaging the frame of the other pair, a double armed slotted segment capable of pivoting on said latter frame, a crank shaft, operative connection between said shaft and said segment for causing permanent rocking motion of said segment, a bolt fixed to the frame about which said angle lever rocks, said bolt extending into the slot of said segment, means for shifting said bolt from one end of said slot to the other and a link pivotally connecting the free end of said angle lever with said bolt.

3. A vehicle comprising in combination, two pairs of runners, a frame rigidly connecting the runners of each pair to form a unit, an angle lever adapted to swing about the frame of one pair and pivotally engaging the frame of the other pair, a double armed slotted segment capable of pivoting on said latter frame, a crank shaft, operative connection between said shaft and said segment for causing permanent rocking motion of said segment, a slotted T-shaped member, a steering column operatively connected with said member for shifting it towards the right or left, a bolt fixed to the frame about which said angle lever rocks, said bolt extending into the slot of said segment and into the slot of said T-shaped member and a link pivotally connecting the free end of said angle lever with said bolt.

In testimony whereof I affix my signature.

RICHARD VENZLAFF.